United States Patent Office 3,564,446

Patented Feb. 16, 1971

3,564,446

FREQUENCY CONTROL IN A FREQUENCY SYNTHESIZER OF VERY HIGH FREQUENCY

Lucien Babany, Blanc-Mesnil, France, assignor to C.I.T.-Compagnie Industrielle des Telecommunications, Paris, France Filed Dec. 6, 1968, Ser. No. 781,880
Int. Cl. H03b *21/00*
U.S. Cl. 331—40 10 Claims

ABSTRACT OF THE DISCLOSURE

Frequency control device wherein the modulation products resulting from modulation between a synthesized frequency and a spectrum of regularly spaced reference frequencies are applied to a first filter passing first order modulation products in a band up to 20% less than one-half the frequency separation between reference frequencies and a second filter passing second order modulation products in a band up to at least 80% less than one-half the frequency separation between reference frequencies, the resulting outputs of the filters being comparable to the desired output of the synthesizer to determine the accuracy thereof.

Figure 1:
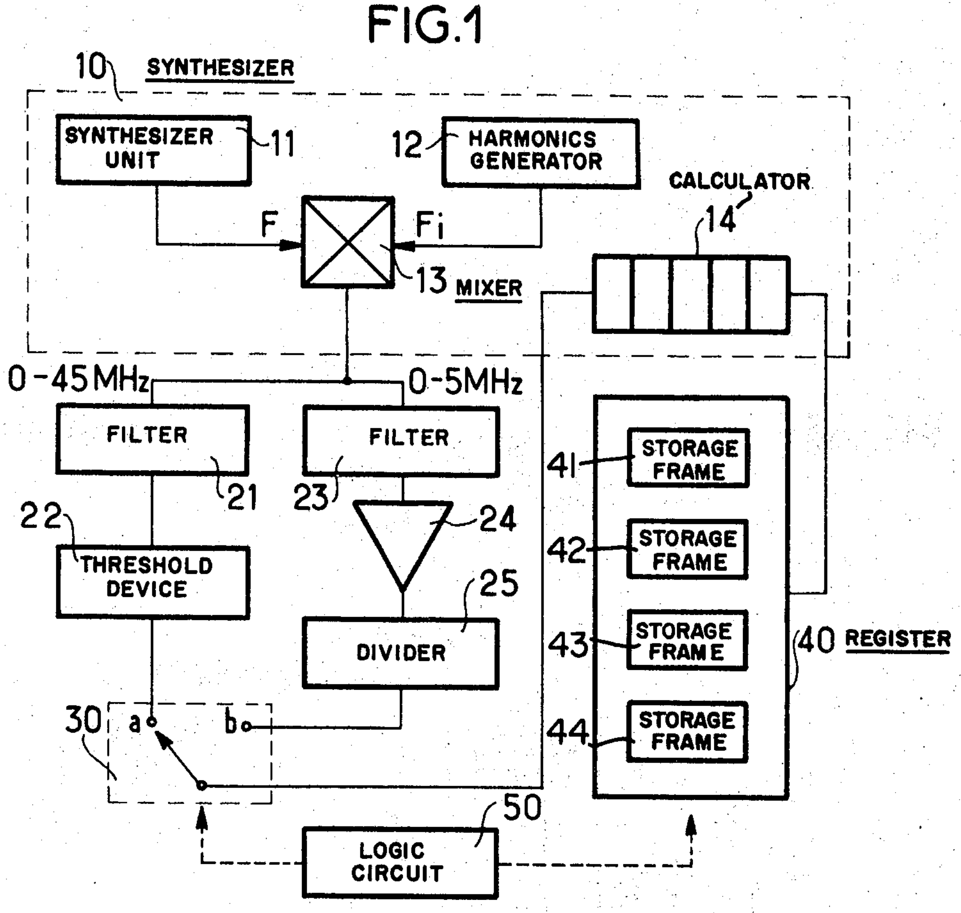

The invention concerns a device for controlling the frequency in an automatic frequency synthesizer, in which the frequency is very high, for instance in the very high frequency band (decimetric waves, frequencies between 300 and 3,000 mc./s.) or in the ultra-high frequency band (centimetric waves, frequencies between 3,000 and 30,000 mc./s).

In an automatic frequency synthesizer the operator indicates by "posting" on a control box the frequency desired in "decimal units" of frequency (for instance one unit or quantification step=10 kc./s., or 100 kc./s., or 1 mc./s. in accordance with the case concerned), and the apparatus is programmed to supply the posted frequency at the end of a few seconds, for instance two seconds. The frequency obtained in practice sometimes differs from the posted frequency, either by one unit of frequency in the most likely case, or by several units of frequency as may happen as a result of an internal failure of the synthesizer resulting, for example, from parasitic pulses disturbing the calculating process. As a result, once the synthesizer is believed to be delivering the posted frequency it is advisable to check to see whether the frequency emitted is actually in accordance with the numerical value posted on the control box.

Solutions to this problem for frequencies lower than 100 mc./s. are known; for instance, if N is the number of frequency units posted on the control box the apparatus may be provided with a calculator associated with a coincidence register in which the value N is stored. The output frequency F of the apparatus may be applied to the input of the calculator, functioning as a variable range divider. From the calculator a frequency $F/N$ issues, which is equal to the quantification step $F_p$ which exists in the apparatus in the form of a high stability frequency. In a suitable assembly, functioning either on an analog basis or on a numerical basis, the frequency $F/N$ is compared with $F_p$ and if these two frequencies are not equal the synthesizer recommences a frequency search.

Another technique used with a synthesizer having an oscillator providing a fundamental range and a series of binary dividers in cascade, for instance four dividers in all, giving a division ratio of 16, is to arrange for the frequency extracted from the divider with the highest range, i.e. $F/16$, to be applied to the input of a totalizing counter connected to a coincidence register. The coincidence register is programmed in accordance with a value $N_1$ equal to the product of the number N of frequency units posted on the control box by a power of 2 such that the actual posted frequency is located in the fundamental range of the oscillator. A frequency synthesizer of this type is described in co-pending application Ser. No. 697,522.

From these two examples, it will be appreciated that the control of frequency in an automatic synthesizer has, up to the present, been bound up with processes which make necessary the intervention of binary computation circuitry either in the form of a calculator or in the form of a chain of dividers. It is however possible to extend the range of functioning of a frequency synthesizer to higher frequency bands, either by frequency multiplication or by frequency modulation with fixed frequencies generated externally. There are thus obtained frequency values, for instance several thousands of megacycles, for which calculating or division methods are not feasible. In this case the above-mentioned conventional methods of checking the delivered frequency are ineffective.

An object of the invention is the provision of a frequency control device for checking the output frequency of a frequency synthesizer.

A frequency control device comprises, in accordance with the present invention, a control box on which a desired frequency to be delivered by the synthesizer is posted; a modulator connected to receive the frequency to be controlled and also a wide step spectrum generator having regularly spaced reference frequencies, a first low-pass filter having a characteristic of mean face rigidity connected to receive the modulator output and having an effective cut-off frequency lower than the mid frequency between two reference frequencies of the spectrum, a second low-pass filter also connected to receive the modulator output and having an effective cut-off frequency substantially equal to half the width of the rising face of the characteristic of the first filter, a frequency divider connected in series with the second filter and adapted to divide by two, and a calculator having its input side switchable between the output of the first filter and the output of the frequency divider, the calculator providing with its output a check on whether the delivered synthesized frequency corresponds to that posted on the control box.

The invention is able to provide an effective control device for the output frequency of the synthesizer in the case where this frequency reaches a value which exceeds the functioning range of currently used electronic calculators.

The device utilizes frequencies obtained by a process of modulation and is accessible to a calculator such as is currently available. The device of the invention has the advantage that it is able to employ modulation devices and filtering devices of simple and economical construction.

Figure 2:
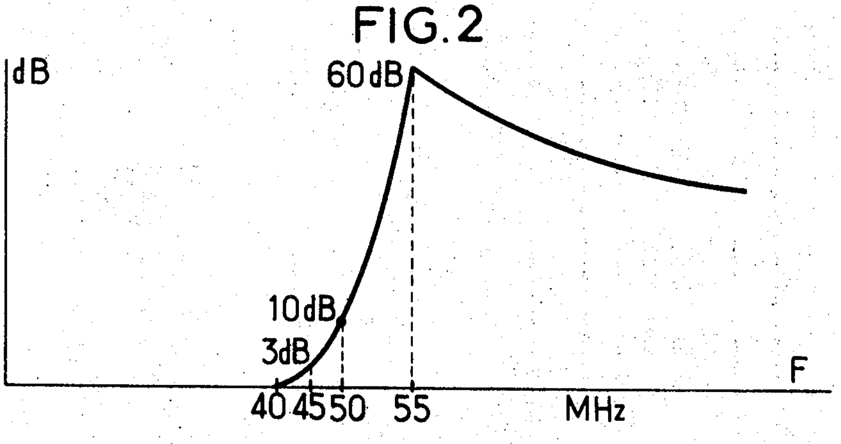

The invention will now be described in greater detail by way of example, with reference to the accompanying drawing in which:

FIG. 1 shows a schematic diagram of a control device for checking a synthesizer output frequency; and FIG. 2 is a graph showing by way of example a characteristic curve of a filter used in the system of FIG. 1.

To explain the invention it is helpful to consider a specific example. Imagine a frequency range extending from 7,000 to 8,000 mc./s. with a "quantification step" of 1 mc./s. It is to be supposed that a desired frequency $f$ is located in the sub-range 7,800–7,900 mc./s. The synthesizer, in the exploration phase carried out by a variable oscillator, searches for a pulse produced by beating of the synthesizer output frequency with a "limit" frequency which is one of the constituents of a harmonics spectrum at the steps of 100 mc./s. after clearing the limit 7,800 mc./s. A calculator counts the pulses against the harmonics of a spectrum as they occur at the quantification step of 1 mc./s.

After the frequency exploration stage has given way to the synchronization stage, control takes place. This control takes place immediately by modulating the output frequency of the synthesizer with the wide step spectrum and by checking the value of the difference frequency thus obtained. However, the pulse of the frequency $f$, i.e., for instance 7,831 mc./s. with a spectrum containing a succession of hundreds of megacycles, i.e., 7,800–7,900 mc./s. and so on, will supply two pulses lower than 100 mc./s.: f—7,800 mc./s.=31 mc./s. and 7,900 mc./s.$-f=69$ mc./s. Of course, a single one of these pulses only should be admitted to the frequency calculator.

It is accordingly necessary to insert a filter between the modulator and the calculator to extract the frequencies lower than 50 mc./s. But such a filter should obey extremely rigorous conditions; in actual fact this filter should pass 50 mc./s. with negligible attenuation while strongly attenuating 51 mc./s., for instance by at least 40 db. A filter of this type would be on the borderline of technical possibilities and would cost a great deal. In order to overcome this difficulty the control device may be made in a rather more complex form which, however, allows it to utilize non-critical components, thus providing an economically priced system of reliable construction.

Instead of using a filter having a rigid step face characteristic cutting out at 50 mc./s., the device utilizes a first low-pass filter with an inclined face effectively cutting off beyond 50 mc./s. and a second low-pass filter with inclined face effectively cutting off at 5 mc./s. The use of such a modified construction will be justified below, the reasoning being based by way of example on the case of limit frequencies spaced by 100 mc./s.

Assume F is the actual output frequency of the synthesizer, $F_1$ is the first limit frequency immediately below F, and $f$ the frequency difference, then: $F=F_1+f$.

If $d$ is the difference between the mid value of the two limit frequencies flanking F and F itself, then for $f$ lower than 50 mc./s., one will have a first value $f_1=(50-d$ mc./s. If $f$ is higher than 50 mc./s., then one has a second value $f_2=(50+d)$ mc./s.

A frequency F gives rise to two pulses, one with $F_1$, the other with $F_1+1$ quantitative step, i.e., $F_1+100$ mc./s.: one of the two pulses, called the useful pulse for purposes of the invention, of necessity provides the value $(50-d)$. This useful pulse passes through the first filter provided that said value $(50-d)$ is less than between 15% and 20% lower than the mid-value 50 mc./s., in practice less than 45 mc./s.; if it is between 45 and 50 mc./s., it is weakened. In this eventuality the other filter of the device intervenes.

The modulator which mixes the output frequency F of the synthesizer with the spectrum of limit frequencies supplies two modulation products of the first order; $f_1$ and $f_2$, but as is well known, it also supplies products of a higher order, in particular products of the second order among which is found the difference between $f_2$ and $f_1$, i.e., $2d$. The amplitude of these second order modulation products is notable, it is only approximately 10 db less than that of the products of the first order. Thus, by provision of binary frequency divider arranged at the output of the second low pass filter, there is collected a frequency $d$ equal to the difference between the output frequency F and 50 mc./s. plus or minus.

In FIG. 1, a box 10 is shown in broken outline and encloses various members of a synthesizer which supply from a unit 11 a high output frequency F, for instance of several gigacycles. A harmonics generator 12 provides a limit spectrum, or wide step spectrum composed of harmonics $F_1$ spaced for instance by 100 mc./s. from one another.

A modulator 13 mixes the frequency F with the wide step spectrum from harmonics generator 12. The unit 11, harmonic generator 12 and mixer 13 exist in any automatic frequency synthesizer to which the control of frequency in accordance with the invention applies.

A low pass filter 21 has a cut-off frequency in the vicinity of 45 mc./s. with advantageously a frequency attenuation characteristic as shown in FIG. 2 in which frequencies above 45 mc./s. are rapidly attenuated to extinction occuring at about 55 mc./s. Such a filter 21 is relatively easy to manufacture at a reasonable price. A threshold member 22 receives frequencies passed by the first filter 21. A second low pass filter 23 also receives the modulator output and has a cut-off frequency in the vicinity of 5 mc./s. An amplifier 24 passes and amplifies the frequencies transmitted through the filter 23 and feeds them to a binary divide-by-two divider 25.

A change-over switch 30 enables an input of a calculator 14 to be selectively connected either to an output $a$ of the threshold member 22 or to the output $b$ of the divider 25. The calculator 14 normally forms part of the frequency synthesizer 10.

A coincidence register 40 is adapted to have "written" into it numerical values which should be equal to values posted into it by the calculator 14 if the frequency output of the synthesizer F is correct. These values are "written" into the storage frames 41, 42, 43, 44.

A logic circuit which controls the position of the switch 30 and also the "writing" of values into the register 40 is shown at 50.

The function of the threshold member 22 is to allow only the modulation products of the first order, and which are more intense than the products of the second order, to reach the calculator 14.

The purpose of the amplifier 24, which may be optionally omitted, is to amplify the second order signals issuing from the second filter 23, and which are relatively weak, to a level which is adequate to actuate the divider 25.

The functioning of the control device will be understood from the following analysis of the four conditions which can occur and cover all the possible frequency selections between two limit frequencies spaced by 100 mc./s.

EXAMPLE 1

When $F=F_1+f_1$, with $f_1=(50-d)$, $d>5$, contactor 30 is connected at $a$. For instance, if $F=7{,}831$ mc./s., with $F_1=7{,}800$ mc./s., $f_1=31$ mc./s. and $d=19$ mc./s., the register 40 carries the indication $f_1$, with $5<f_1<45$, i.e., 31 in the present case.

EXAMPLE 2

When $F=F_1+f_2$, with $f_2=(50+d)$, $d>5$, contactor 30 is connected at $a$, i.e., $F=7{,}869$ mc./s., with $F_1=7{,}800$ mc./s., $f_2=69$ mc./s. and $d=19$ mc./s. The member 40 carries the indication $(100-f_2)$, with $55<f_2<100$, i.e., 31 in the present case.

EXAMPLE 3

When $F=F_1+F_1$, with $f_1=(50-d)$, $d<5$, contactor 30 is connected at $b$. For instance, if $F=7{,}847$ mc./s., with $F_1=7{,}800$ mc./s., $f_1=47$ mc./s. and $d=3$ mc./s., the member 40 carries the indication $(50-f_1)$ with $$45<f_1<50$$

i.e., 3 in the present case. Here the filter 23 passes the second order modulation product $(f_2-f_1)$ which is $53-47=6$ mc./s. The divider 25 then provides $d=3$ mc./s.

EXAMPLE 4

When $F=F_1+f_2$, with $f_2=50+d$, $d<5$, contactor 30 is connected at $b$. For instance, if $F=7{,}853$ mc./s., with $F_1$=7,800 mc./s, $f_2$=53 mc./s., and $d$=3 mc./s., the member 40 carries the indication( $f_2$—50) with $$50<f_2<55$$

i.e., 3 in the present case. Again the filter 23 passes the second order modulation product ($f_2$—$f_1$) and the divider 25 provides $d$=3 mc./s.

The logic circuit 50 may function in one of the two following ways:

(1) Either it explores the various combinations above, stopping at the first coincidence met.

(2) Or it is positioned by the control box which is used to indicate to the operator the frequency which the synthesizer is to deliver. In this latter case, the register 40 is immediately posted at the value which it should carry in accordance with the numerical value of the desired frequency.

In a variation of the invention, the low pass filter 21 is replaced by a pass band filter transmitting the frequency band 5–45 mc./s. In this case the threshold member 22 of FIG. 1 is not needed.

I have shown and described an embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are obvious to one of ordinary skill in the art.

What is claimed is:

1. A frequency control device for a frequency synthesizer comprises a control box on which a desired frequency to be delivered by the synthesizer is posted, a modulator connected to a frequency synthesizer to receive the frequency to be controlled and also to a generator of a wide step spectrum having regularly spaced reference frequencies, a first low-pass filter having a filter characteristic of mean face rigidity connected to receive the modulator output having an effective cut-off frequency lower than the mid frequency between two reference frequencies of the spectrum, a second low-pass filter also connected to receive the modulator output and having an effective cut-off frequency substantially equal to half the frequency width of the rising face of the characteristic of the first filter, a frequency divider connected in series with said second filter and capable of division-by-two and calculator means having its input selectively connected to the output of the first filter or the output of the frequency divider for indicating whether the delivered synthesized frequency corresponds to that posted on the control box.

2. A control device as claimed in claim 1, in which the effective cut-off frequency of the first filter is between 15% and 20% below the mid-frequency between two spectrum reference frequencies.

3. A device as claimed in claim 1, in which said calculator means includes coincidence register means which receives a signal significant of the posted frequency and responds to coincidence by signifying the synthesizer delivered frequency is equal to that posted on the control box.

4. A device as claimed in claim 1, in which a threshold device is connected to said first filter and further including switch means for connecting said calculator means selectively to the output of one of the two filters.

5. A device as claimed in claim 1, in which said first low pass filter is constructed as a low pass-band filter having the lower cut-off limit of the passed band substantially equal to the upper cut-off frequency of the second filter and the higher cut-off limit equal to said cut-off frequency which is lower than the mid-frequency between two reference frequencies of the spectrum.

6. A device as claimed in claim 2, in which said calculator means includes coincidence register means which receives a signal significant of the posted frequency and responds to coincidence by signifying the synthesizer delivered frequency is equal to that posted on the control box.

7. A device as claimed in claim 6, in which a threshold device is connected to said first filter and further including switch means for connecting said calculator means selectively to the output of one of the two filters.

8. A device as claimed in claim 7, in which said first low pass filter is constructed as a low pass-band filter having the lower cut-off limit of the passed band substantially equal to the upper cut-off frequency of the second filter and the higher cut-off limit equal to said cut-off frequency which is lower than the mid-frequency between two reference frequencies of the spectrum.

9. A frequency control device for a frequency synthesizer comprising a frequency synthesizer providing a selected frequency in a range of frequencies, a generator of a wide step spectrum of regularly spaced reference frequencies, a modulator having inputs connected to said synthesizer and said generator, respectively, first filter means having a cut-off frequency between 15% and 20% below one-half the frequency spacing between said reference frequencies and connected to the output of said modulator for passing only the first order modulation product at the output of said modulator which falls within the pass band thereof, second filter means having a cut-off frequency substantially equal to the frequency difference between the cut-off frequency of said first filter means and one-half the frequency spacing between said reference frequencies and connected to the output of said modulator for passing only the second order modulation product at the output of said modulator which falls within the pass band thereof, dipider means connected to the output of said second filter means for dividing the output frequency thereof by two, storing means for storing a frequency value forming at least a part of the frequency to be provided by said synthesizer, and comparing means for selectively comparing the value in said storing means to the value provided by said first filter means or said divider means.

10. A device as claimed in claim 9 wherein said first filter means includes threshold means for preventing passage of second order modulation products from said modulator.

References Cited

UNITED STATES PATENTS 3,320,547 5/1967 Standford et al. ........ 331—37

JOHN KOMINSKI, Primary Examiner

U.S. Cl. X.R.

331—37